(12) United States Patent
Berg et al.

(10) Patent No.: US 11,787,459 B2
(45) Date of Patent: Oct. 17, 2023

(54) WIRE ACTIVATED RIM BRAKE SYSTEM FOR A ROLLATOR

(71) Applicant: TOPRO INDUSTRI AS, Gjøvik (NO)

(72) Inventors: Jonas Berg, Oslo (NO); Martin Dahl, Fredrikstad (NO); Josef Tangen, Gralum (NO)

(73) Assignee: TOPRO INDUSTRI AS, Gjøvik (NO)

( * ) Notice: Subject to any disclaimer, the term of this patent is extended or adjusted under 35 U.S.C. 154(b) by 442 days.

(21) Appl. No.: 17/278,902

(22) PCT Filed: Sep. 20, 2019

(86) PCT No.: PCT/NO2019/050190
§ 371 (c)(1),
(2) Date: Mar. 23, 2021

(87) PCT Pub. No.: WO2020/067902
PCT Pub. Date: Apr. 2, 2020

(65) Prior Publication Data
US 2022/0041201 A1    Feb. 10, 2022

(30) Foreign Application Priority Data
Sep. 24, 2018   (NO) .................................. 20181241

(51) Int. Cl.
*A61H 3/04*   (2006.01)
*B62B 5/04*   (2006.01)

(52) U.S. Cl.
CPC ............. *B62B 5/0476* (2013.01); *A61H 3/04* (2013.01); *B62B 5/0447* (2013.01); *A61H 2003/046* (2013.01)

(58) Field of Classification Search
CPC ....... B62B 5/0476; B62B 5/0447; A61H 3/04; A61H 2003/046
(Continued)

(56) References Cited

U.S. PATENT DOCUMENTS 8,316,999 B2 * 11/2012 Solinski .................. B62B 9/087
188/20
2002/0050697 A1   5/2002 Hallgrimsson et al.
(Continued)

FOREIGN PATENT DOCUMENTS

CA   2 498 165 A1   1/2006
CN   104859703 A    8/2015
(Continued)

OTHER PUBLICATIONS

European Patent Office, Extended European Search Report issued in counterpart European Patent Application No. 19867827.8, dated Jun. 2, 2022.
(Continued)

*Primary Examiner* — Christopher P Schwartz
(74) *Attorney, Agent, or Firm* — Leydig, Voit & Mayer, Ltd.

(57) ABSTRACT

A wire activated rim brake system for a rollator partly positioned inside a rollator frame is disclosed. The system compromises a brake housing positioned close to a wheel of the rollator and inside the rollator frame, wherein the housing compromises an entry opening and sliding surfaces oriented at a right angle to the rotational axis of the wheel. The system further compromises a brake assembly to be positioned in the housing compromising a sliding section adapted to the slide along the sliding surfaces inside the housing and a brake section extending at a right angle from the sliding section and protruding through the entry opening. The system also comprises a brake path on the inner rim of the rollator wheel which is parallel with the rotational axis of the wheel.

6 Claims, 8 Drawing Sheets

(58) Field of Classification Search
USPC .... 188/1.12, 19, 20, 29, 74–76, 77 R, 77 W, 188/78, 324, 325
See application file for complete search history.

(56) References Cited

U.S. PATENT DOCUMENTS

| | | |
|---|---|---|
| 2005/0194218 A1 | 9/2005 | D'Arca |
| 2006/0266593 A1 | 11/2006 | Cerreto et al. |
| 2012/0133106 A1 | 5/2012 | Liu |
| 2018/0116899 A1 | 5/2018 | Schaaper et al. |

FOREIGN PATENT DOCUMENTS

| | | | |
|---|---|---|---|
| CN | 107530219 A | 1/2018 | |
| EP | 1 997 710 A2 | 12/2008 | |
| JP | 2002-282314 A | 10/2002 | |
| JP | 2017-72172 A | 4/2017 | |
| KR | 2018-0099382 A | 9/2018 | |
| WO | WO 02/22070 A2 | 3/2002 | |
| WO | WO 2008/020049 A1 | 2/2008 | |
| WO | 2014/198312 A1 | 12/2014 | |
| WO | 2016/137322 A1 | 9/2016 | |
| WO | WO 2016/164902 A1 | 10/2016 | |

OTHER PUBLICATIONS

Japanese Patent Office, Office Action issued in counterpart Japanese Patent Application No. 2021-516645, dated Apr. 11, 2023—English Translation.
International Bureau, International Search Report in International Application No. PCT/NO2019/050190, dated Dec. 17, 2019.

\* cited by examiner

WIRE ACTIVATED RIM BRAKE SYSTEM FOR A ROLLATOR

CROSS-REFERENCE TO RELATED APPLICATIONS

This patent application is the U.S. National Stage of International Patent Application No. PCT/NO2019/050190, filed Sep. 20, 2019, which claims the benefit of Norwegian Patent Application No. 20181241, filed Sep. 24, 2018, which are each incorporated by reference.

FIELD OF THE INVENTION

The present invention concerns a rollator with rim brake hidden in the frame and a method for installing a brake assembly into a rollator frame.

BACKGROUND OF THE INVENTION

Rollators are important aid for elderly people or people who have problems with walking. Safe operation and effective brakes are important as well as few outside disturbing parts as cables and excess external brake parts assemblies. Especially protruding parts on the lower part of the rollator are prone to cause harm or entanglement.

Patent document WO2016137322 A1 discloses a rollator-trolley assembly comprising a preferably continuously arranged bracket shaped handle at a rear upper side of the assembly, wherein the bracket shaped handle is pivotally adjustable between a rollator position. The bracket shaped handle is substantially directed to a front side, and a trolley position, in which the bracket shaped handle is substantially directed towards a rear side; wherein free walking space is provided between the wheels of the rollator-trolley assembly in the rollator position. The brake system in WO2016137322 A1 includes a brake/friction pad that is brought into contact with rims on the inner peripheral surface of the roller wheel.

Known rollators have external brake systems where the brake cables and brake assemblies are outside the frame. Such external part can be disturbing, collecting dirt and shortening the life time of the brake system of a rollator. Some brake systems are also inconvenient to insert or change. In addition, the design of a rollator is less elegant with several excess external parts.

The purpose of the present invention is to provide a device and a method that addresses at least one of the above problems while retaining the benefits of prior art.

SUMMARY OF THE INVENTION

The invention describes a wire activated rim brake system for a rollator partly positioned inside a rollator frame. The system comprises a brake housing positioned close to a wheel of the rollator and inside the rollator frame. The housing comprises an entry opening and sliding surfaces oriented at a right angle to the rotational axis of the wheel.

The system further comprises a brake assembly to be positioned in the housing comprising a sliding section adapted to slide along the sliding surfaces inside the housing when the brake system is activated and adapted to enter into position through the entry opening. The brake assembly also comprises a brake section extending at a right angle from the sliding section and protruding through the entry opening when the brake assembly is positioned inside the housing. The system further comprises a brake cover comprising a cover gap allowing movement of the brake assembly, wherein the brake cover is covering the brake housing and the sliding section of the brake assembly and is fastened to the frame. The brake system furthermore comprise a brake path on the inner rim of the rollator wheel which is parallel with the rotational axis of the wheel and a brake pad fastened to the brake section of the brake assembly and adapted to engage the brake path when a brake lever is activated. The brake system also comprises a brake wire connected to the brake lever, wherein the brake wire is fastened to the sliding section of the brake assembly wherein a return spring mounted onto the brake wire pretensions the brake pad away from the brake path.

In another aspect the invention also comprises a method for mounting the brake system according to claim 6.

BRIEF DESCRIPTION OF THE DRAWINGS

The invention will be described in greater detail below be means of exemplary embodiments with reference to the accompanying drawings, in which like numerals in different drawings describe the same feature.

DETAILED DESCRIPTION

We will in the following describe a system for one wheel and one brake lever. A rollator usually have two systems associated with one respective front wheel each.

The invention describes a wire activated rim brake system 1 for a rollator partly positioned inside a rollator frame 10. The system comprises a brake housing 6 positioned close to a wheel of the rollator and inside the rollator frame. The housing comprises an entry opening 12 and sliding surfaces 3 oriented at a right angle to the rotational axis of the wheel. The system further comprises a brake assembly 2 to be positioned in the housing. The brake assembly comprises a sliding section 4 and a braking section 5. The sliding section is adapted to slide along the sliding surfaces 3 inside the housing 6 when the brake system is activated, and it is adapted to enter into position through the entry opening. Preferably the sliding section 4 has sides that are parallel with the sliding surfaces 3 of the housing when the brake assembly is positioned inside the housing. The brake section 5 is protruding at a right angle from the sliding section 4 and is protruding through the entry opening when the brake assembly is positioned inside the housing.

The system further comprises a brake cover 7 comprising a cover gap 11 allowing movement of the brake assembly, wherein the brake cover 7 is covering the brake assembly 2 and housing 6 and is fastened to the frame. The system also comprises a brake path 16 on the inner rim of the rollator wheel, which is parallel with the rotational axis of the wheel. Preferably the brake path is separated. The advantage of having the brake path 16 on the inner rim is that less dirt interferes with the two interacting surfaces (brake path and brake pad). A brake pad 15 is fastened to, or molded in one piece with, the brake section 5 of the brake assembly and is adapted to engage the brake path when a brake lever 13 is activated. A brake wire 17 is connected to the brake lever 13. The brake wire is fastened to the sliding section of the brake assembly and a return spring 8 threaded on to the brake wire is positioned between the frame and the sliding section 4 causing the brake wire to be pretensioned and keep the brake pad away from the brake path when the brake lever is not engaged.

Figure 1:
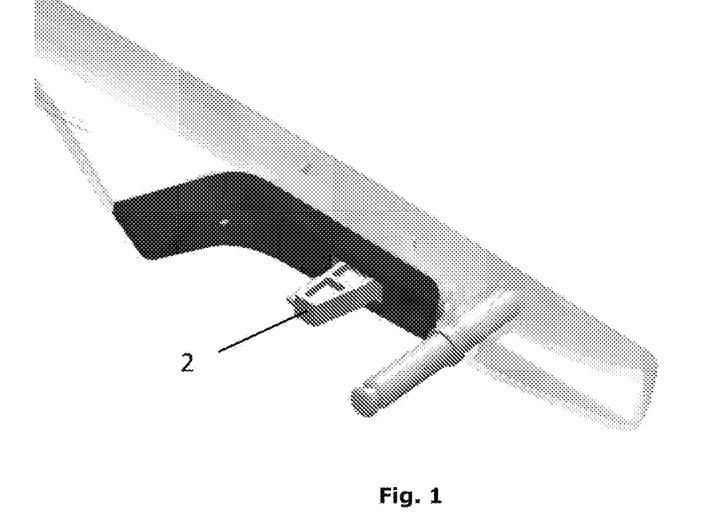
FIG. 1 illustrates the lower part of the roller frame with the brake mechanism inside the frame.
Figure 2:
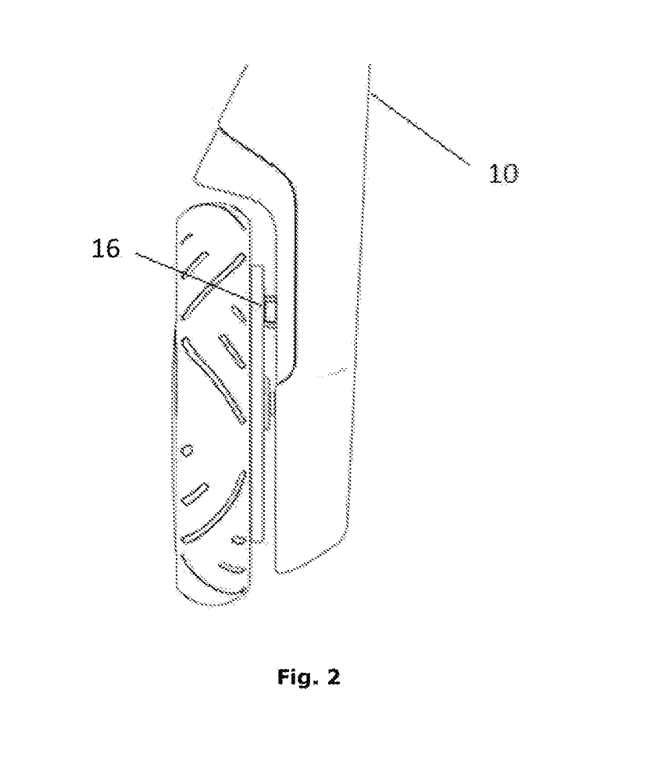
FIG. 2 illustrates the lower part of the frame including a wheel of the rollator.
Figure 3A:
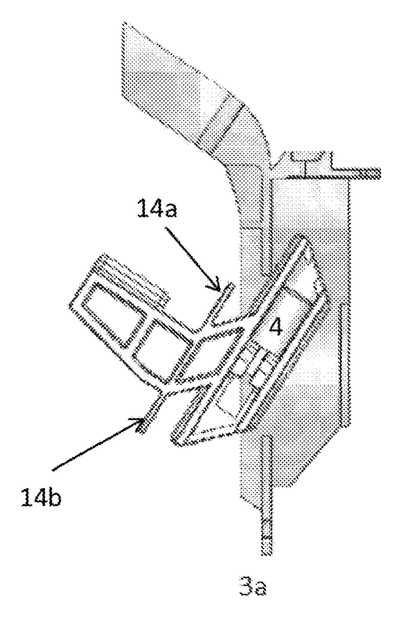
FIGS. 3a-3d illustrate how the brake assembly is installed into the brake housing in the frame.
Figure 3B:
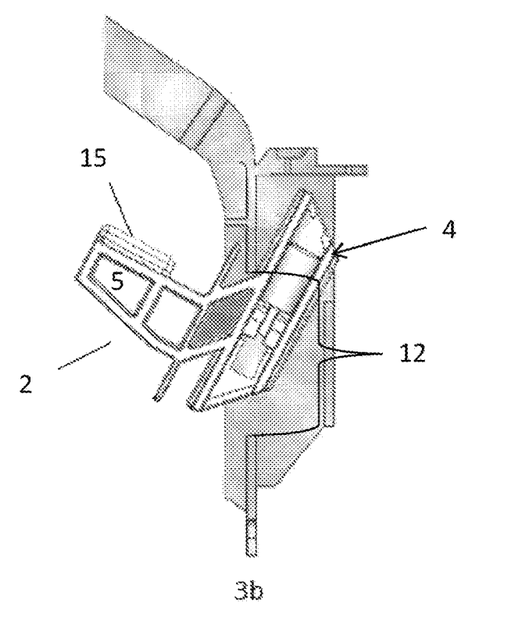
Figure 3C:
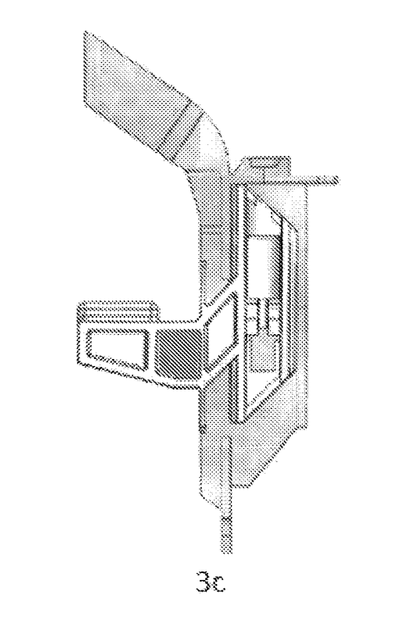
Figure 3D:
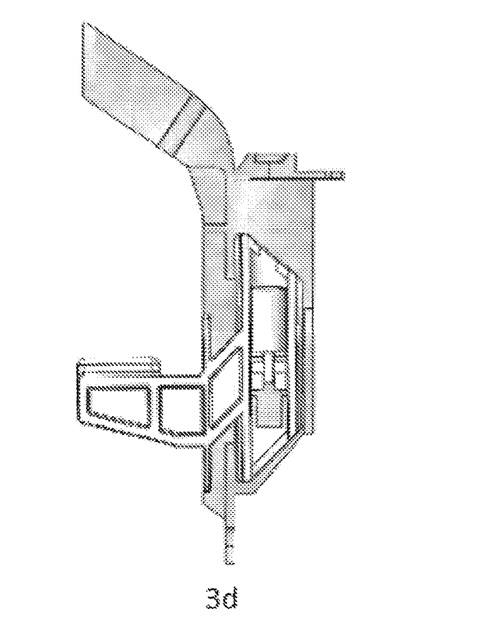
Figure 4:
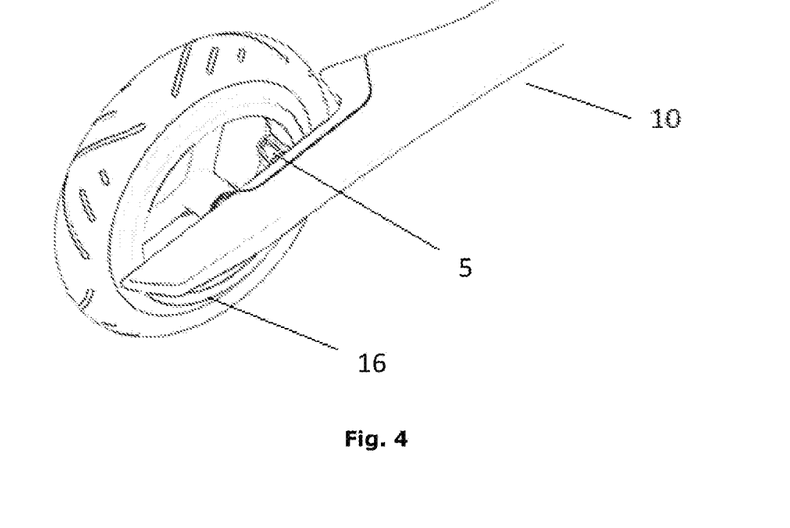
FIGS. 4-5 illustrate the lower part of the rollator where the brake pad engages the brake path on the inner rim of the rollator wheel.
Figure 5:
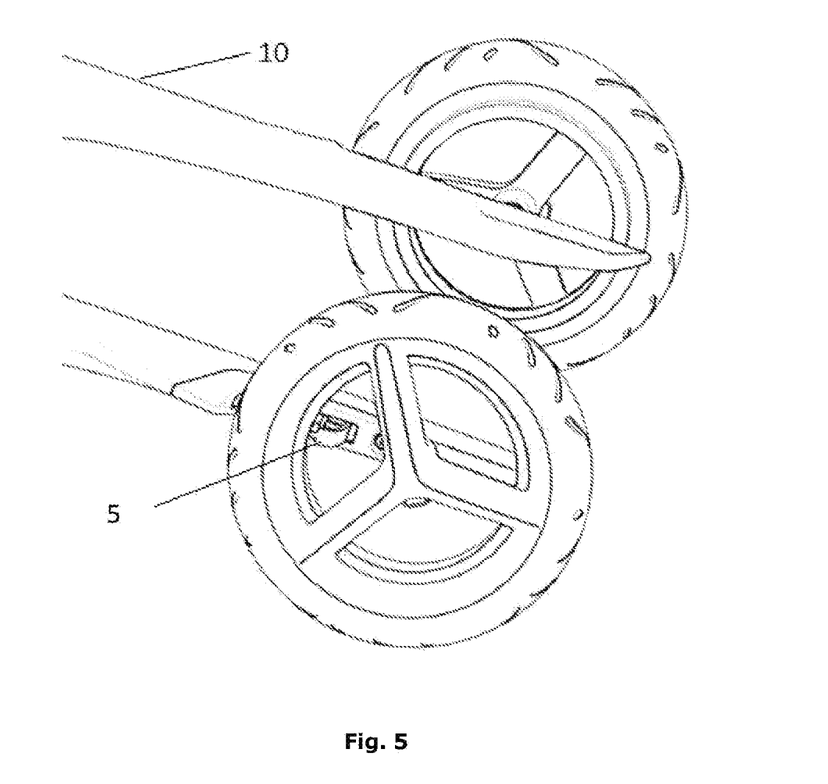

The brake is a rim brake as illustrated in FIGS. 4-5. FIGS. 4-5 shows the lower part of the frame where the brake pad engages the brake path on the inner the rim of the rollator wheel. The brake pad assembly is adapted to slide along sliding surfaces inside the brake housing 6 when the brake lever is activated. The activation causes the length of the brake wire inside the housing to be shorter, and the retraction spring 8 in the brake housing 6 is compressed such that the brake pad 4 engages the brake path on the inner rim of the wheel. Preferably the surface of the brake path on the inner rim is perpendicular to the plane of the wheel. Preferably the spokes of the wheel are separated from the brake path in a direction parallel with the rotational axis of the wheel by a sufficient distance to avoid the brake section to interfere with the spokes, causing blocking of the wheels rather than controlled braking action.

Mounting of the brake assembly is illustrated in FIG. 3a-3d. The design of the brake assembly 2, brake housing 6 and the brake cover 7 facilitates a very simple mounting procedure. The brake assembly is installed in the housing in the rollator frame by first pulling the brake wire through the entry opening and mounting the brake wire and return spring in matching structures in the sliding section 4. Several variations of structures are common in the industry and will not be described in detail. Next step is tilting the brake section of the brake assembly into the housing through the entry opening 12 of the brake housing 6. In one embodiment this is done when the housing is taken out of the frame. In another embodiment this is done with the housing located inside the frame 10. Thereafter the brake cover 7 is mounted onto the brake assembly such that the brake section 5 protrudes through the cover gap 11. The brake cover 7 and the brake housing 6 are fastened to the frame 10 with fasteners 9a, 9b. Preferably the fasteners fasten both the brake cover and the housing at the same time. The mounting method provides structural advantages that simplify the plastic casting process of the brake housing, and it maintains strength and rigidity.

In an advantageous embodiment a front and a rear dirt protection plate (14a, 14b) are fastened on the lower part of the brake section parallel with the sliding section. The dirt plates (14a, 14b) fits snugly under the brake cover 7 and are designed to slide along the underside of the brake cover in order to prevent dirt from entering and also to keep the brake assembly in position if the sliding section is exposed to forces causing the brake assembly 2 to exit through the entry opening 12.

Figure 6:
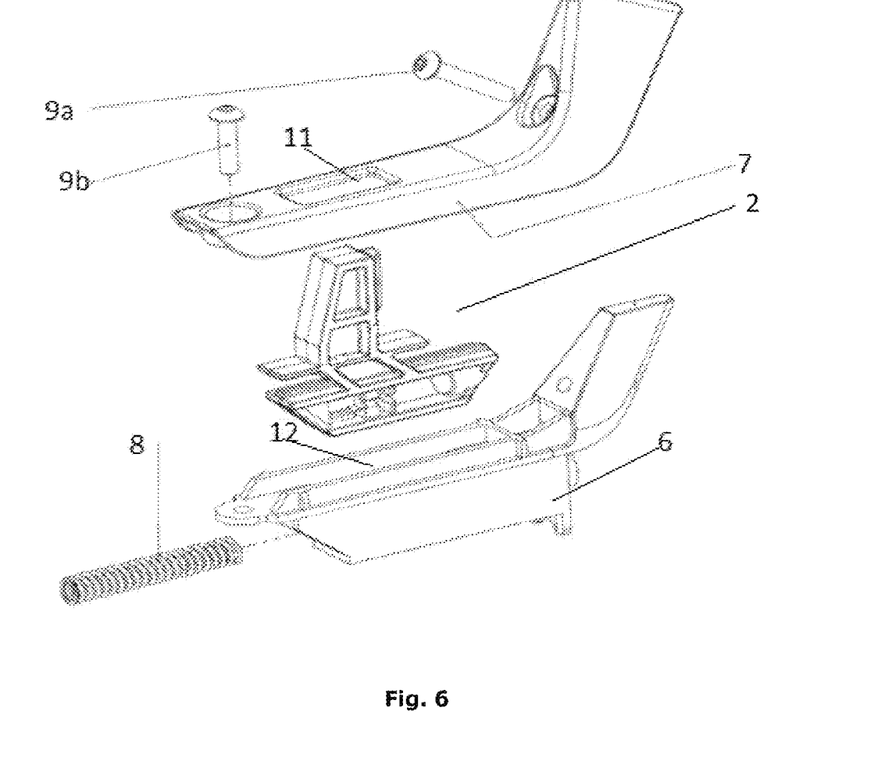
FIG. 6 illustrates the brake housing, the brake assembly, the spring and the cover.
Figure 7:
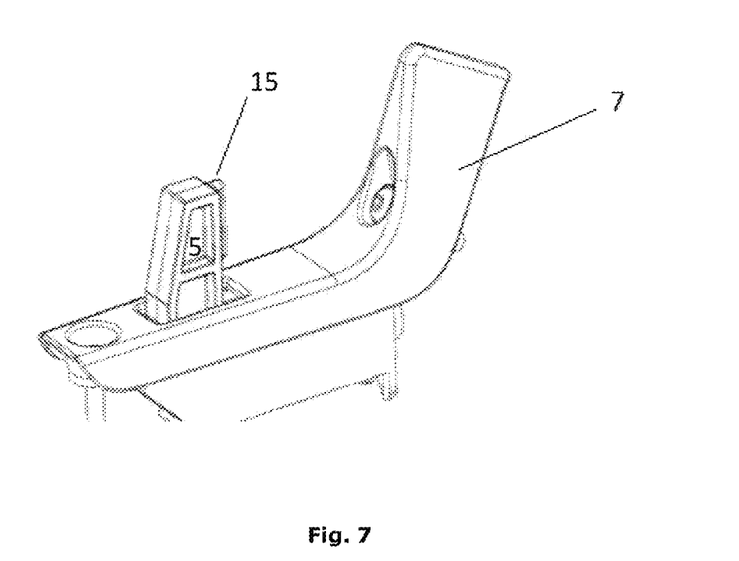
FIGS. 7 and 8 illustrate the parts assembled, where the brake section with brake pad protrudes through a cover gap in the brake cover.
Figure 8:
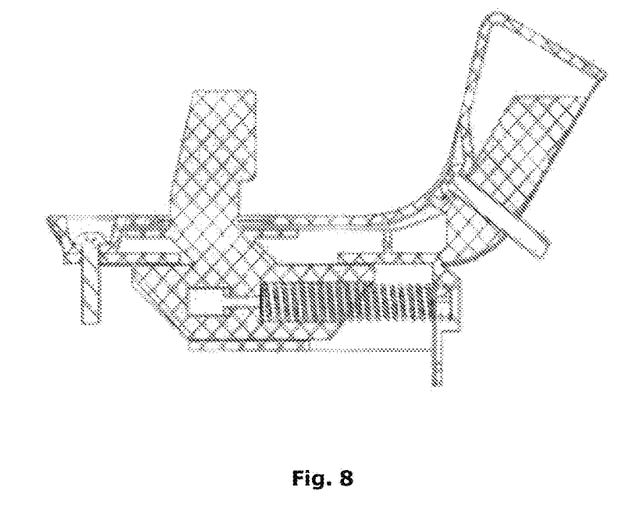
Figure 9:
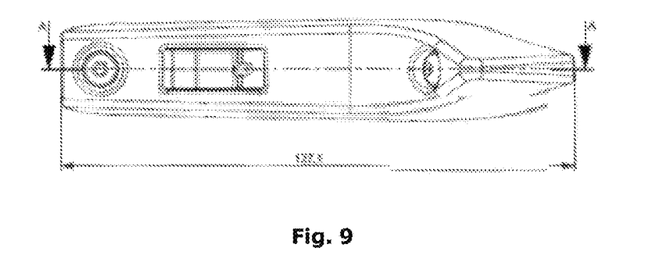
FIG. 9 illustrates a side view of the lower part, with the brake cover and the brake assembly.

FIG. 6 illustrates the brake housing 6, brake assembly 2, the return spring 8 and the brake cover 7 as separate parts before mounted together. These parts assembled are illustrated in FIGS. 7 and 8, where the brake section with brake pad protrudes through the cover gap 11 in the brake cover. This is illustrated from the side in FIG. 9. FIG. 8 also shows the return spring 8 positioned in the brake housing 6.

Figure 10:
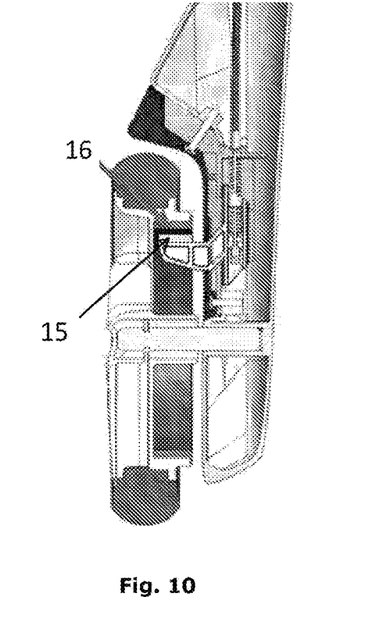
FIG. 10 illustrates a cross-sectional top view of the lower part.
Figure 14:
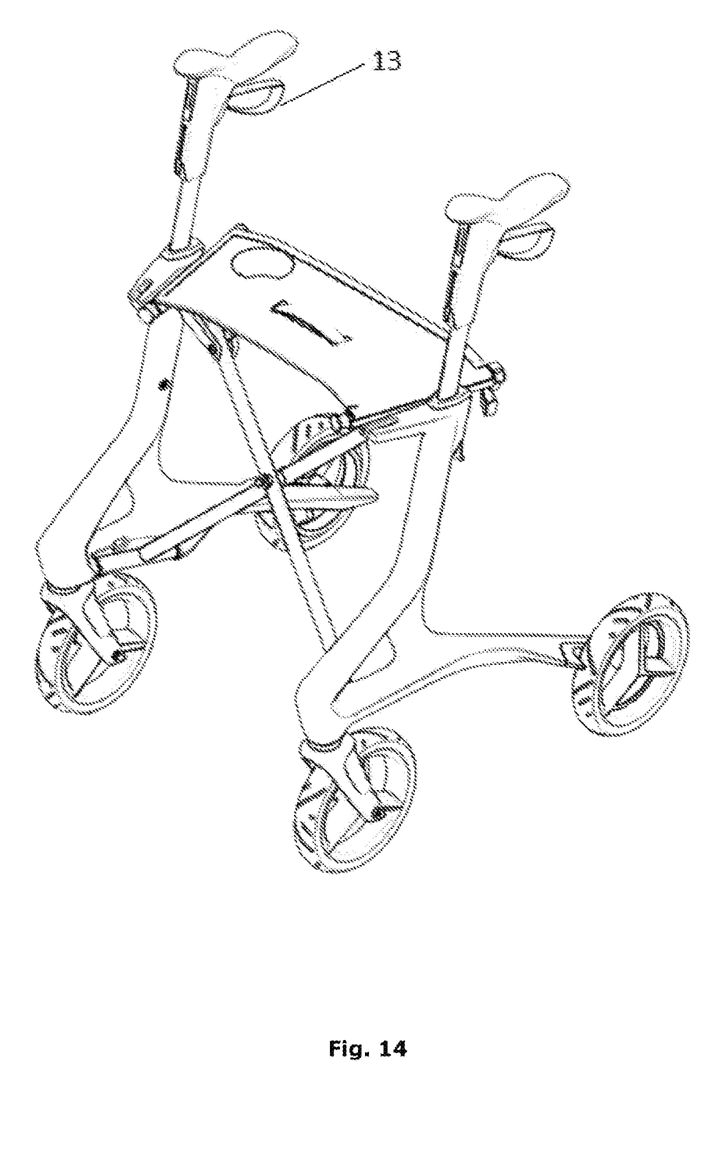
FIG. 14 illustrates a rollator with rim brake hidden in the frame.

A cross-sectional top view of the lower part of the rollator is illustrated in FIG. 10. It also illustrates the brake pad engaging the brake path on the inner rim of the rollator wheel and the internal brake mechanism. The brake wire may be positioned inside the rollator frame 10 and the brake levers 13 are positioned at the hand grips of the rollator as illustrated on FIG. 14. In order to simplify the overall construction of the rollator the brake wire may be external when passing the height adjustment mechanism.

Figure 11:
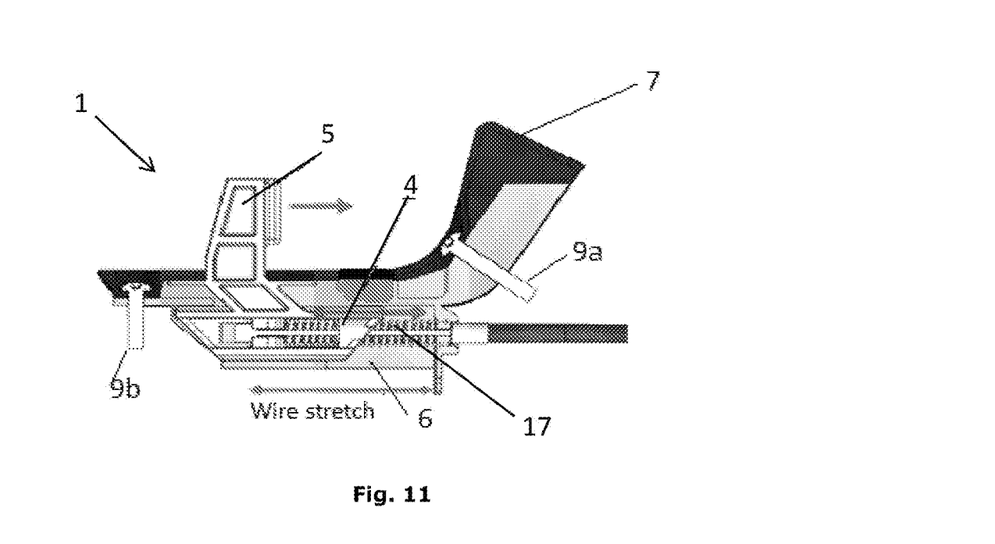
FIG. 11 illustrates the entire system except the wheel and brake lever.
Figure 12:
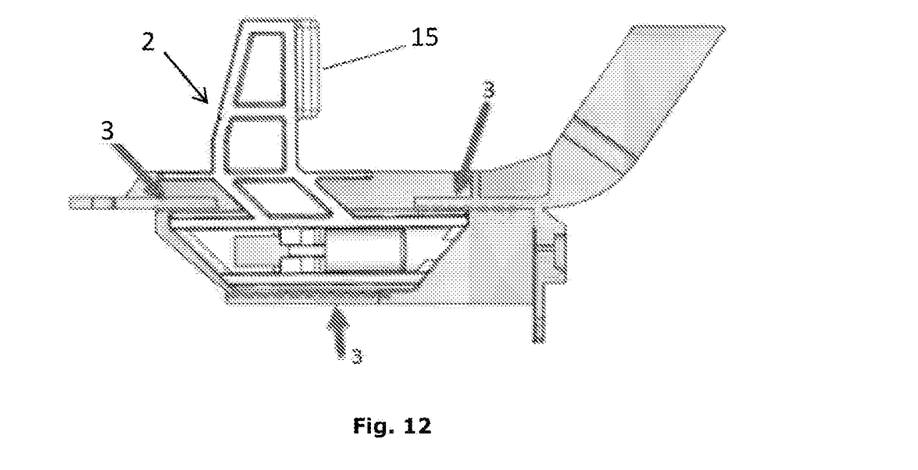
FIG. 12 illustrates the internal mechanism, the primary function of the brake.

The primary functions of the brake are illustrated in FIGS. 11 and 12. FIG. 11 shows the entire brake system 1 except the brake path on the inner rim of the wheel. In rest position the wire stretch will be long enough for the return spring 8 to be fully extended and the brake pad 15 is kept away from the brake path 16 on the rim. When the lever is activated such that the length of wire inside the housing becomes shorter, the return spring 8 will be compressed and the brake pad 15 engages the brake path. The brake path 16 is preferably made of overmolded thermoplastic elastomer, which provides high friction when the brake pad is in contact with the brake path.

Competing rollators in the market mainly have outside braking mechanisms that apply braking force to the outside on the wheel's roller surface. According to the present invention the brake mechanism is hidden inside the roller frame and braking force is applied to a brake path on the inner rim of the wheel.

The present invention differs from the prior art of WO2016137322 A1, by that the brake assembly comprises a sliding section 4 disposed in a brake housing 6 inside the rollator frame, a brake cover 7 for the housing that hides the mechanical parts and which appears as an integral part of the frame. The brake cover 7 has a cover gap through which the brake section 5 with the brake pad 15 is protruding. Further, according to the invention the sliding section 4 of the brake assembly is adapted to slide along sliding surfaces 3 inside the brake housing 6 when the brake lever is actuated and wherein the actuation causes the length of wire 17 extending from the frame inside the housing to become shorter such that the return spring in the housing is compressed until the brake pads engage the brake path 16 of the wheel.

Figure 13:
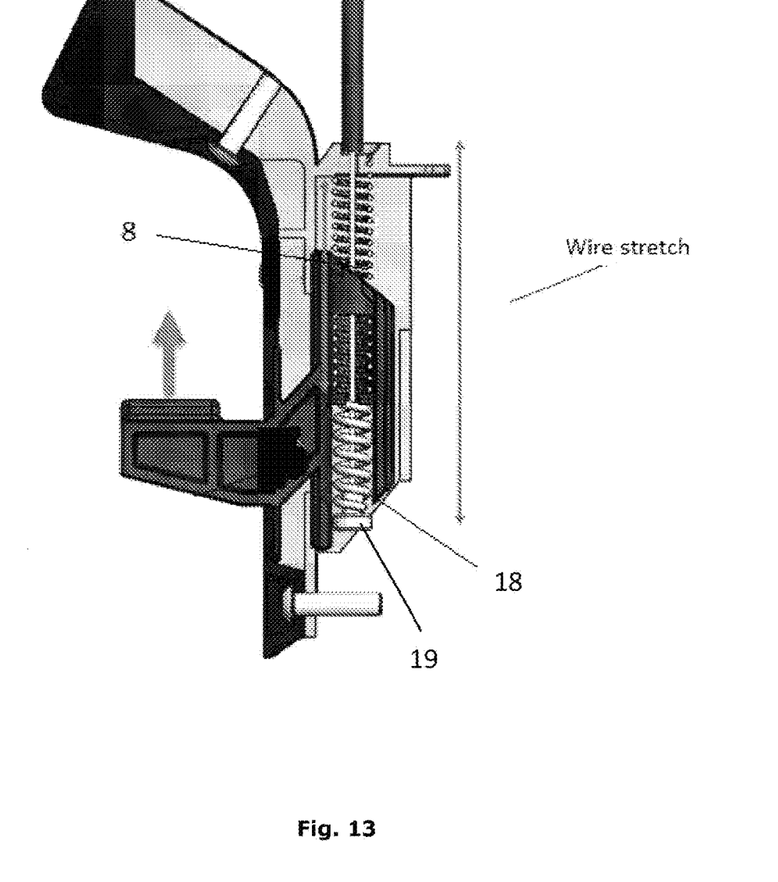
FIG. 13 illustrates the abundance spring.

A potential additional function is illustrated in FIG. 13. This figure shows abundance control of the brake. This is an extra feature on the power transmission from the wire to the brake pad. An abundance spring 18 is mounted between a wire head 19 at the end of the wire and the sliding section 4

In rest position, the wire stretch 2 will be long enough for the return spring 8 to be fully tensioned and keeps the brake pad away from the brake path of the wheel. The abundance spring 18 will also be fully extended. When the lever is activated such that the length of wire 17 extending into the housing becomes shorter, the return spring 8 will be compressed until the brake pad engages the wheel. When the brake pad is fully engaged with the brake path, the abundance spring 18 will make sure that there is enough ambulare in the wire stretch 1 for the lever to enter a hand brake position, if necessary.

The rollator according to the invention is advantageous by that there is no unwanted or unnecessary protruding or superjacent parts. The brake mechanism is compact, can be built into a slim frame. Positioning the brake path on the inner rim makes it possible to use soft wheels which provide user comfort.

While the invention has been described with reference to specific examples and embodiments, the scope of the invention is determined by the accompanying claims.

INVENTORY

1. Wire activated rim brake system
2. Brake assembly
3. Sliding surfaces
4. Sliding section
5. Brake section
6. Brake housing
7. Brake cover
8. Return spring
9a and b brake cover fasteners
10. Rollator frame
11. Cover gap
12. Entry opening
13. Brake lever
14a and b front and rear dirt protection plates
15. Brake pad
16. Brake path
17. Brake wire
18. Abundance spring
19. Wire head

The invention claimed is:

1. A wire activated rim brake system for a rollator partly positioned inside a rollator frame comprising:
   a brake housing positioned close to a wheel of the rollator and inside the rollator frame, wherein the brake housing comprises an entry opening and sliding surfaces oriented at a right angle to a rotational axis of the wheel;
   a brake assembly to be positioned in the housing comprising:
      a sliding section adapted to slide along the sliding surfaces inside the brake housing when the wire activated rim brake system is activated, and adapted to enter into position through the entry opening,
      a brake section extending at a right angle from the sliding section and protruding through the entry opening when the brake assembly is positioned inside the brake housing, and
      a brake pad fastened to, or molded in one piece with, the brake section;
   a brake cover comprising a cover gap allowing movement of the brake assembly, wherein the brake cover is covering the brake assembly and is fastened to the rollator frame;
   a brake path on an inner rim of the wheel which is parallel with the rotational axis of the wheel, and separated from wheel structures in a direction parallel with the rotational axis of the wheel and wherein the brake pad is adapted to engage the brake path when the wire activated rim brake system is activated, and
   a brake wire connected to a brake lever, wherein the brake wire is fastened to the sliding section of the brake assembly, wherein a return spring mounted onto the brake wire pretensions the brake pad away from the brake path.

2. The system according to claim 1, wherein the brake wire is inside the rollator frame.

3. The system according to claim 1 wherein the brake lever is positioned at a rollator handgrip.

4. The system according to claim 1 wherein a front and a rear dirt protection plate are fastened to the brake section and are adapted to fit snugly under the brake cover and prevent dirt from entering the cover gap.

5. The system according to claim 1, wherein an abundance spring is mounted between a wire head and the sliding section for enough ambulare in wire stretch for the brake lever to enter a hand brake position.

6. A method for installing a brake assembly into a brake housing of a wire activated rim brake system for a rollator wherein the rollator is partly positioned inside a rollator frame, wherein the wire activated rim brake system comprises the brake housing positioned close to a wheel of the rollator and inside the rollator frame, wherein the brake housing comprises an entry opening and sliding surfaces oriented at a right angle to a rotational axis of the wheel;
   a brake assembly to be positioned in the housing comprising a sliding section adapted to slide along sliding surfaces inside the brake housing when the wire activated rim brake system is activated, and adapted to enter into position through the entry opening; a brake section extending at a right angle from the sliding section and protruding through the entry opening when the brake assembly is positioned inside the brake housing, and a brake pad fastened to, or molded in one piece with, the brake section;
   a brake cover comprising a cover gap allowing movement of the brake assembly, wherein the brake cover is covering the brake assembly and is fastened to the rollator frame;
   a brake path on an inner rim of the wheel which is parallel with the rotational axis of the wheel, and separated from wheel structures in a direction parallel with the rotational axis of the wheel and wherein the brake pad is adapted to engage the brake path when the wire activated rim brake system is activated, and
   a brake wire connected to a brake lever, wherein the brake wire is fastened to the sliding section of the brake assembly, wherein a return spring mounted onto the brake wire pretensions the brake pad away from the brake path;
   wherein the method comprises
   pulling the brake wire through the entry opening,
   mounting the brake wire and return spring in matching structures in the sliding section,
   tilting the sliding section into the brake housing through the entry opening, and
   mounting the housing and brake cover onto the rollator frame with fasteners such that the brake section is protruding through the cover gap.

\* \* \* \* \*